United States Patent [19]

Draper et al.

[11] 4,399,600
[45] Aug. 23, 1983

[54] VEHICLE DOOR CONVERSION

[75] Inventors: David L. Draper, Hamburg; Gerald D. McKee, Highland, both of Mich.

[73] Assignee: Cars and Concepts, Inc., Brighton, Mich.

[21] Appl. No.: 282,043

[22] Filed: Jul. 10, 1981

[51] Int. Cl.³ .............................................. B22D 19/10
[52] U.S. Cl. .................................. 29/401.1; 29/426.4; 296/146; 49/502
[58] Field of Search ................. 29/401.1, 426.4, 426.1, 29/402.8; 296/146, 147, 149; 49/502, 506

[56] References Cited

U.S. PATENT DOCUMENTS

| 4,047,751 | 9/1977 | Koike | 296/146 |
| 4,238,876 | 12/1980 | Monroe et al. | 29/401.1 |
| 4,261,615 | 4/1981 | Deaver | 29/401.1 |

Primary Examiner—Francis S. Husar
Assistant Examiner—David B. Jones
Attorney, Agent, or Firm—Reising, Ethington, Barnard, Perry, Brooks & Milton

[57] ABSTRACT

A method of converting a sedan body having doors with framed and sliding windows to a vehicle body having doors with unframed windows including the substitution of a new glass window panel larger than the original glass panel and a new support system for holding the new panel in engagement with seals in the closed position of the door.

8 Claims, 8 Drawing Figures

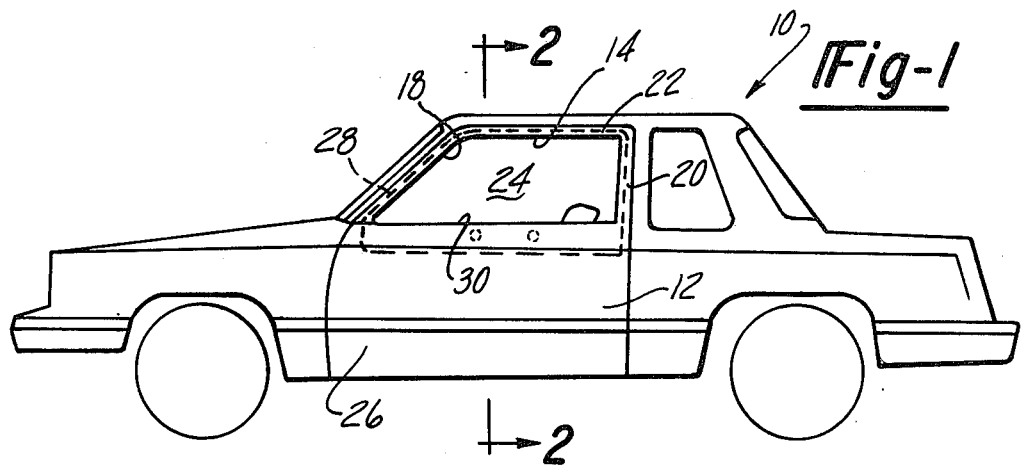
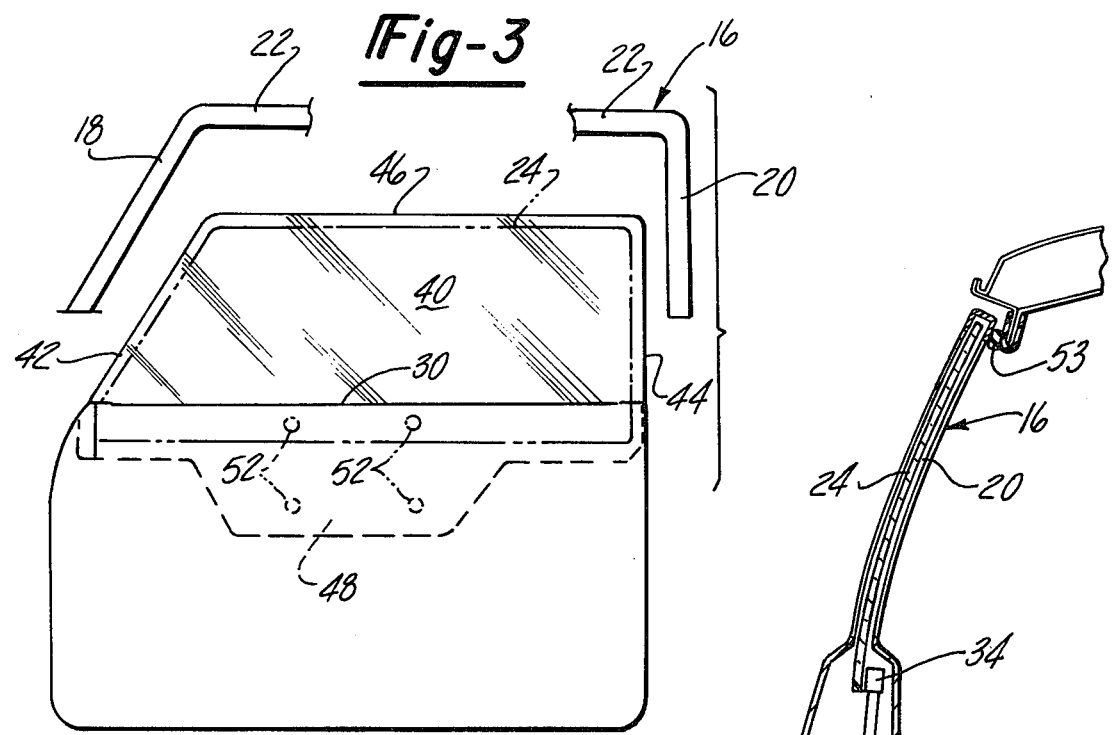
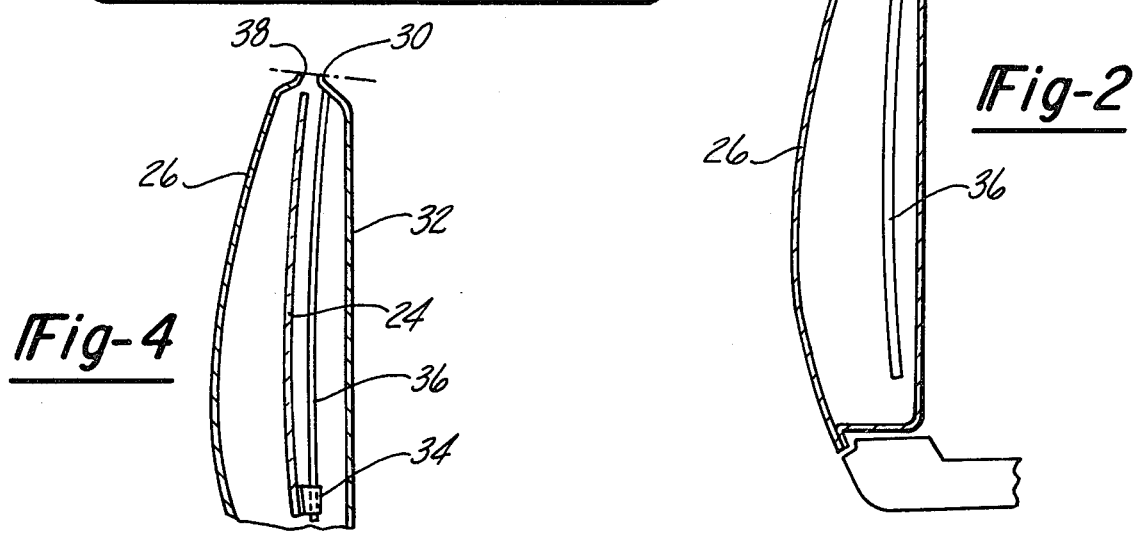

VEHICLE DOOR CONVERSION

This invention relates to automotive vehicle bodies and more particularly to a method of converting a sedan type body with framed door windows to a vehicle body having unframed door windows.

The majority of automobiles of current manufacture have sedan bodies in which the doors have a frame extending upwardly from the main door portion to a frame and guide a generally vertically sliding window. There is, however, a demand for vehicles without framed windows such as vehicles which are to have T-tops, targa tops, folding tops or hardtops. T-tops are vehicles having a pair of removable panels covering a pair of openings in the roof that are continuous with the door openings and targa style vehicles have a single opening in the roof extending continuously from one side of the vehicle to the other and continuous with the door openings. In convertibles the entire top folds and retracts. With such body styles, framed windows in the vehicle doors prevent full advantage intended to be achieved with the removable roof panels or folding top. In hard-top vehicles the door windows are unframed primarily for esthetic purposes.

It is an object of this invention to provide a method of converting the doors of sedan type vehicles in which the window is framed, to doors having unframed windows.

The method of the invention provides a means of converting sedan type vehicle bodies having framed windows to a vehicle body of the T-top, convertible top or targa top or hard top. Particularly with vehicles having roof modifications or changes such as that encountered with the targa, T-top or convertible, the converted door makes it possible to fully utilize the top features and even without such top modifications gives the hard top effect.

The method of the invention contemplates cutting the door at opposite sides of the window opening and removing the frame, removing the glass panel and installing a new glass window panel having a larger perimeter than the original glass panel, removing the original seal acting between the vehicle body and door in the area of the removed frame and installing a new seal assembly on a separate surface of the body to engage the new window panel when the door is in a closed position.

The method of the present invention is described in reference to the accompanying drawings in which:

FIG. 1 is a side elevation of a sedan type vehicle body having doors with framed windows;

FIG. 2 is a cross-sectional view at an enlarged scale taken generally on line 2—2 in FIG. 1;

FIG. 3 is a view of a door at an enlarged scale shown spearately from the remainder of the vehicle after it has been modified;

FIG. 4 is a view similar to FIG. 2 after the door has been partially modified;

Figure 5:
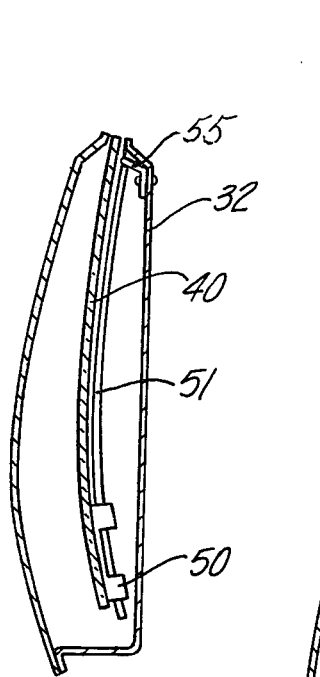
FIG. 5 is a view of the door seen in FIG. 4 after further modification.

Referring to the drawings a sedan type vehicle is shown having a body 10 with a door 12. The door 12 has a window opening 14 formed by a frame having a forward frame portion 18, a rearward frame portion 20 and a top frame portion 22 connecting the frame portions 18 and 20. The window opening 14 receives a sliding glass panel 24 which retracts into the lower door body portion 26 of the door 12.

When the window opening 14 is closed by the glass panel 24 as seen in FIG. 2, the glass panel 24 occupies the space outlined by broken line 28. In that position the entire perimeter of the glass panel 24 is supported by the frame 16 and by a door portion adjacent to the upper edge of the lower door body 26.

The frame 16 and particularly the rearward frame portion 20 acts as a guide and support for the glass panel 24 during vertical movement upon opening and closing of the window opening 14. The door 12 and its opening in the vehicle body 10 as well as the window opening 14 have seals and trim which can vary in detail from vehicle to vehicle and are not illustrated.

Modification of the door 12 as seen in FIGS. 1 and 2 to a frameless door shown in FIGS. 3 through 6 begins with cutting of the forward frame 18 and rearward frame 20 along a horizontal line substantially in alignment with the lower edge of the window opening 14 and the upper edge 30 of the door 12. A severing operation can be conducted with a portable metal saw with the glass panel 14 in its retracted or lowered position within the door body 26 as seen in FIG. 4. After severing of the frame 16, it is removed giving a condition as illustrated in FIG. 4. With the glass panel 24 within the body 26 openings in the inner door panel 32 give access to guide means in the form of a slide 34 fastened to the glass panel 24 and a guide rod or tube 36 fastened to the door body 26. With the slide 34 removed from the window panel 24 the panel 24 can be removed through the slot 38 in the upper edge 30 of the door body 26.

A new glass panel 40 is installed which as seen in FIG. 3 has a forward edge 42, a rearward edge 44 and a top edge 46 defining a panel edges or perimeter larger than the original glass panel 28 which is indicated in dot-dash lines. In addition, the new glass panel 40 has a lower portion 48 which extends substantially lower than the lower edge of the original glass panel 24.

The new glass panel 40 is installed through the slot 38 in the top of the door body 26 after which a new guide mechanism including a slide assembly 50 and guide tube 51 are installed through access openings in the inner door panel 32. The slide 50 of the guide mechanism has a greater vertical height than the original slide mechanism 34 and is fastened to the glass panel 40 through means of the openings 52 seen in FIG. 3. In addition, a new guide tube 51 is mounted relative to the door body 26.

The additional size of the lower portion 48 and the guide mechanism 50 are required to support the new glass panel 40 and to guide it during movement between a retracted and a raised position to replace the support afforded by the original frame 16. As seen in FIG. 2, the original door frame 16 is available not only to guide and support the glass panel 24 but also to engage a seal 53, typically afforded relative to the door opening and engaging the frame 16. In the modified door, the panel 40 engages a different type of seal assembly 54 and particularly during closing movement of the door the forces applied in a substantially horizontal direction must be overcome by the wider lower portion 42 of the glass panel and guide mechanism 50, 51.

After the new glass panel 40 and guide mechanism 50, 51 is installed a stop element 55 is installed within the door body 26 and is attached to the inner side of the door panel 32. The stop 55 is generally L-shaped and engages the slide mechanism 50 when the window panel 40 is raised to its upper portion when the door is open. In the original framed sedan door the frame itself serves to limit movement of the panel 24.

Figure 8:
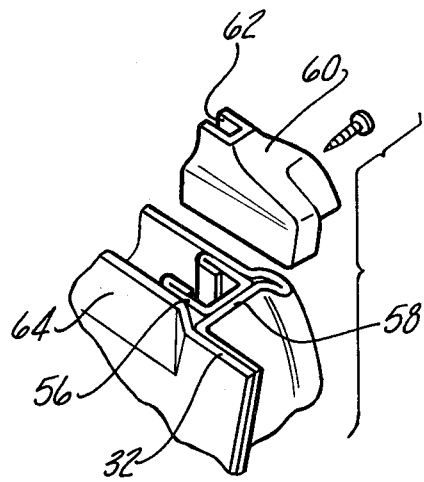
FIG. 8 is a perspective view at an enlarged scale of the upper rear edge of a door with window frame removed.

After the new glass panel 40 is installed new door moldings and caps must be installed. As seen in FIG. 8, the top rear edge of the door where the frame 16 has been sawed presents raw edges in the form of a channel 56, the top edge of the inner panel 32 and the sheet metal portion 58 forming part of the rearward frame portion 20. These edges are covered by a molded rubber cap 60 which covers the upper edges of the channel 56, panel 32 and end sheet metal 58. The cap 60 forms a guide channel portion 62 to guide and seal the rear edge 44 of the glass panel 40. The cap 60 merges with other moldings such as that indicated at 64 and with a similar cap, not shown, at the forward edge of the door body 26 at the point where forward frame portion 18 has been sawed.

Figure 7:
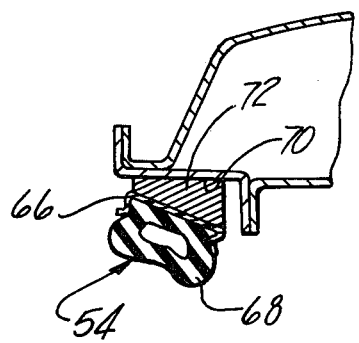
FIG. 7 is a cross-sectional view of a typical seal section used with the modified door.

The original seal 53 is disposed around the door opening above the belt-line, that is, that portion of the seal 53 which originally engaged the door frame 16 is removed and replaced with a new seal assembly 54. The seal assembly 54 includes a channel member 66 and a resilient seal portion 68 disposed in the channel member 66. The channel 66 and seal 68 are spaced from the door edge 70 by a spacer 72, a typical section of which is shown in FIG. 7. The spacer 72 is used to attain the proper angle or attitude of the seal assembly 54 relative to the new glass panel 40 and makes it possible to adjust the perimeter of the door opening by variations in the spacer 72.

Figure 6:
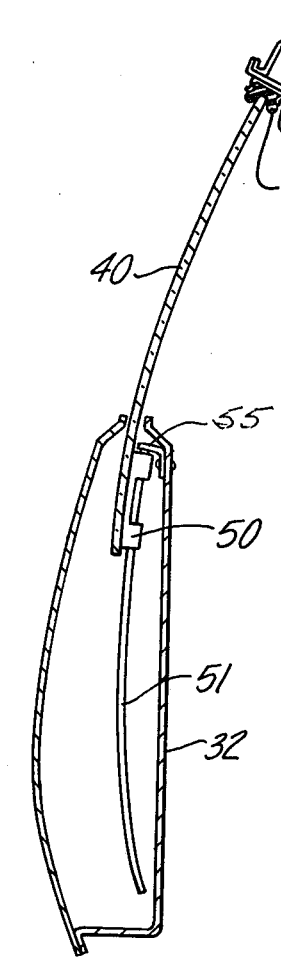
FIG. 6 is a view similar to FIG. 5 showing the door with a new glass panel in raised position relative to a seal assembly.

The seal assembly 54 seen in FIGS. 6 and 7 is shown in association with a roof portion of a vehicle but a substantially identical seal section is used on the door opening to engage the forward and rearward edges 42 and 44 of the new glass panel 40. In the case of the T-top, targa top vehicles, and convertibles, a substantially identical seal assembly 54 also would be fastened to the removable panel or panels to the convertible top side rail.

A method of converting a sedan body having doors with framed sliding windows to a vehicle body having doors with unframed windows has been provided in which the frame portion of the original door is cut away and a new glass panel is substituted which provides the necessary reinforcement to support the glass panel so that it is supported at its lower end. The door panel cooperates with a new seal associated with the door opening in the vehicle body which permits accomodating door and window panel spacing variations and angular attitude of the glass panel relative to the door opening.

The embodiments of the invention in which an exclusive property or privilege is claimed are defined as follows:

1. The method of converting a sedan body having doors with framed and sliding windows to a vehicle body having doors with unframed windows comprising the steps of: cutting the door frame at opposite sides of the window opening, removing the frame, removing the glass window panel through the upper end of the door, installing a new glass window panel having a larger perimeter than the original glass window panel, and installing a seal assembly to the edge of the door opening to engage the new window panel when the door is in a closed position.

2. The method of claim 1 and further comprising the step of installing a stop element to limit upward movement of said glass window panel.

3. The method of claim 1 and further comprising installing a spacer between said seal assembly and said door opening.

4. The method of claim 1 which comprises cutting said door frame along a horizontal line substantially in alignment with the lower edge of said glass window panel.

5. The method of claim 1 which comprises installing said new window panel through the upper edge of the door after said frame has been removed.

6. The method of claim 1 which, comprises installing a new window panel whose perimeter is enlarged a greater amount at its lower edge than at its top and side edges.

7. The method of claim 6 and further comprising the steps of adding guide means adjacent said lower edge of said new window panel to hold said window panel relatively stable relative to said door when said window panel is in an upper position.

8. The method of claim 3 which comprises installing said spacer to dispose said seal at an angle to receive and engage said glass panel when the door is moved from an open to a closed position and when said glass panel is moved from an open to a closed position.

* * * * *